United States Patent Office 3,436,724
Patented Apr. 1, 1969

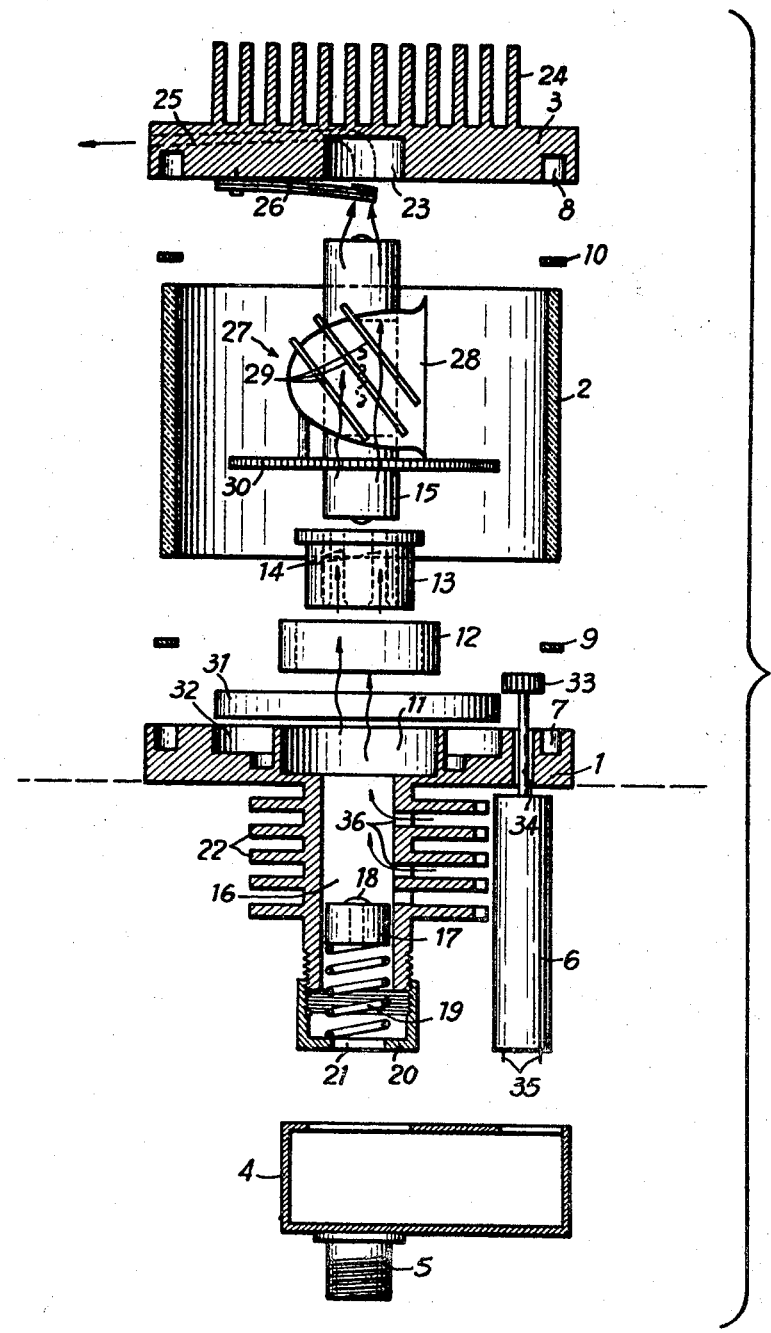

3,436,724
ANTICOLLISION NAVIGATIONAL LIGHTS
Pierre Edmond Tuffet, 7 Rue du Marechal Foch,
Tarbes, Hautes Pyrenees, France
Continuation-in-part of application Ser. No. 502,017,
Oct. 22, 1965. This application Jan. 24, 1967, Ser.
No. 611,368
Claims priority, application France, Aug. 26, 1966,
74,212
Int. Cl. C08g 5/00; B60a 1/46; B64d 47/02
U.S. Cl. 340—25                                    9 Claims

ABSTRACT OF THE DISCLOSURE

An anticollision light for aircraft comprises a body including a cap and a base and a glass pane between the cap and the base that defines within it an enclosure for an iodine light. Apertures extend through the base and through the cap; and when the light is mounted on an aircraft, the enclosure communicates with the interior of the aircraft so that the relatively low pressure on the outside draws air up through the base to cool the enclosure and out through the cap. Heat-sensitive means adjacent the apertures regulate the opening of the apertures relative to the lamp temperature.

The present invention relates to anticollision navigational lights and is a continuation-in-part of my application No. 502,017, filed Oct. 22, 1965, now abandoned, said lights being intended as already set forth to permit the pilots of aircrafts or like vehicles to perceive from a normal safety distance the existence or approach of other crafts so as to stave off the risk of a collision with them. In some cases, for example in the field of aeronautics, anticollision lights or projectors are compulsory and the present invention is described hereafter as applied to an aeronautical anticollision navigational light although no limitation is involved in this and the invention is also applicable to sea crafts or vessels because maritime or naval authorities attach a growing importance to the provision of these lights.

It may be recalled here that as these lights are safety appliances, the international civil aircraft authorities laid down international standards expressing in mathematical form the average physiological degree of perception of the human eye. But such standards are so high that so far no device has been sufficiently improved to satisfy and cope with them.

The advent of iodine vapor lamps permitted the required optical characteristics to be obtained but further difficulties resulted because the use of such lamps involves new problems that are difficult to solve as regards the elimination of the huge quantity of heat produced by them. The solution of these problems is still harder to find where it is desired to build miniature devices as those that are for example required for aeronautical purposes.

It is an object of the invention to provide a new or improved navigational anticollision light fulfilling the aforesaid requirements and capable of emitting light whose longevity is much higher than that of conventional lights.

Usual anticollision navigational lights generally comprise a pair of incandescent lamps (in contrast to iodine cycle lamps) including a mirror fitted upon the bulb or ampulla. These two lamps are arranged in back to back relation and are revolved in a horizontal plane. They emit a rotary beam of light so that when an observer is in the field of one of the beams, he perceives the light in blinking form. Attention is directed to the fact that in the application of the blinking light art, it happens most of the time that for reasons due to the manufacturing cost, the perception of such lights by the human eye is considerably reduced. This is demonstrated by the aforesaid mathematical equation representing the degree of perception. Such reduction can only be compensated for by resorting to extremely powerful light sources. Even an electric discharge in an atmosphere made of rare gases does not provide such a compensation. This is due to the fact that, when using blinking light, movableness of the light beam through the space is suppressed and that in the field of perception the human eye awards preponderance to such movableness.

Obviously this technique necessitates for anticollision navigational lights dimensions and geometrical shapes which are less and less compatible with the speed of modern aircraft because such lights increase the drag. Moreover, due to the fact that the vertical fins to which said lights are secured have a thickness which decreases in proportion as the flight speeds are increased, proper fitting of said lights becomes more and more difficult and expensive to achieve.

Another object of the invention is to obviate the disadvantages of known anticollision navigational lights owing to the provision of a projector including a iodine vapor lamp and possessing a high luminuous power while having a small size and a shape that is adapted to the utmost degree to a reduction of its areodynamic drag.

Another object still of the invention is to provide a jector utilizable among other purposes as an aeronautical anticollision navigational light while being easily convertible into a rotating or blinking light.

Yet another object of the invention is to provide a miniature projector having a high luminous power for use particularly as a navigationaal light on board aircraft and other vehicles and comprising a body defining an enclosure along the longitudinal axis of which there is fitted a lamp, advantageously of a type having a bulb containing iodine vapor associated with the necessary electric connections, a revolving unit including a reflector, a carrier and means cooperating with said carrier and connectible to an exteriorly located source of electric energy, said unit being removably fitted inside said enclosure so as to be revoluble about its longitudinal axis, whereby the projector can be used as a revolving light when said unit is revolved or alternatively as a blinking light after said unit has been dismantled and the terminals feeding the lamp have been connected to a remotely located flashing control device.

The invention comprises in a preferred embodiment an anticollision navigational light utilizable in the aeronautical or similar fields and comprising a miniature projector having a high luminous power including a body defining an inner enclosure along the longitudinal axis of which is mounted a iodine vapor lamp associated with the necessary electric connections, a unitary revolving unit comprising a reflector, a carrier, an antifriction bearing such as a ball bearing and means associated with said carrier and connectable to an interior or exterior source of energy, said unit being removably fitted inside said enclosure so as to be revoluble about its longitudinal axis, whereby the projector may be used as a revolving light by rotating said unit or as a blinking light by dismantling said unit and connecting the feeding conductors of the lamp to a remotely located blinking station, ventilating channels provided adjacent the iodine vapor lamp, and heat sensitive means performing regulation of the efficient sectional area of said channels in terms of the lamp temperature.

Advantageously the projector comprises a cap, a base, a glass pane interposed between said base and cap, a housing for antinoise filters, an electric micromotor forming a driving unit and a connector for connecting the apparatus to the electric system of the aircraft or other vehicle. Cooling fins are advantageously provided on the base and on the cap and the set up is such as to provide an intimate heat connection between said elements and the lamp so as to achieve a satisfactory cooling effect and to avoid the formation of so-called "heat barriers." Compression of the glass pane between the base and cap of the projector is preferably obtained by means of "spring wires" or like guys having a high tensile strength but of very small sectional area so as to lessen to the maximum extent their shading effect amidst the light beam.

In order to improve control of the regulation of temperature and lamp ventilation, channels are provided in the projector cap, said channels preferably leading from places on both sides of the upper terminal of the lamp and ending rearwardly of the cap in the zone where a depression prevails due to the rapid flow of the air streamlets due to the effect of the craft or vehilce speed. The projector base also has air inlet ports which preferably terminate on the opposite sides of the lower terminal of the lamp. Attention is drawn to the fact that the ports in the projector cap are situated outside the craft frame or cockpit while the ports in the projector base are situated inside the same. Ventilation is thus easy to understand. Actually as the cap ports are in a state of depression whereas the base ports are subjected to pressure, an air current is generated between the base and cap. During its path, said air rubs the lamp ampulla which is made of glass or quartz and it also rubs the inside of the reflector, thus eliminating the excess of heat toward the outside atmosphere. Suitable filters may be interposed if desired in the path of the ventilating air.

For complying with the operating conditions of a iodine vapor lamp whose temperature should not exceed a given range, lest the iodine cycle is interrupted, the ports in the projector cap and/or base are preferably controlled by bimetallic strips or like elements. Thus where the temperature of the lamp tends to come down, such strips more or less throttle the free sectional area of the ventilation ports. When the operation of the projector is stopped, adjustment may be such that said bimetallic strips close off said ports from any permanent communication with ambient air.

For using the device in aeronautics, the cylindrical glass pane interposed between the projector cap and base should be colored red for example or more generally have a tint whose trichromatic coordinates are well determined and controlled by means of a spectrometer. Glass panes used heretofore in the art are tinted throughout their mass so that responsive to temperature variations, such "tint shifts" occurred that the color ultimately came out of the range of values required for the aforesaid trichromatic coordinates. In accordance with the invention, the glass as used is such that temperature variations are practically without any influence on its color. Advantageously the glass pane comprises an annulus of colorless "Pyrex" glass bearing a superficial cement coating deposited in vacuum and at a high temperature either on its inner or on its outer surface or a micrometric coating of a colored plastic.

The aforesaid revolving unit preferably comprises a ball bearing having fitted thereon a toothed wheel or like element supporting in turn a mirror whose features are described hereafter. Such a toothed wheel is driven by an electric micromotor secured to the projector base. However this wheel may be driven from a remote power source through the medium of a flexible cable. If desired, the electric motor may be replaced by a manual control, for example where the anticollision light is fitted upon a police car or a fireman van.

The aforesaid mirror supported by the toothed wheel is advantageously an entirely metallic mirror having a high reflecting power and comprising one or several parts. Optically speaking, said mirror has several curvature radii depending upon the geometrical shape of the required light beam projected through the space. As the mirror is revolved about the iodine vapor lamp and close to it, this mirror operates at a high temperature and in order to restrict the resultant rise of temperature it carries on its outer face helical cooling fins which, during rotation of said mirror, behave as a ventilator and facilitate the escape of ventilating air toward the projector cap ports. The heat-exchanging surface of the mirror can also be increased by any other suitable means.

With these and such other objects in view as will incidentally appear hereafter, the invention comprises the novel construction and combination of parts that will now be described with reference to the accompanying diagrammatic drawing exemplifying the same and forming a part of the present disclosure.

The single figure of the drawing is an exploded vertical sectional view of a suitable constructional form of a projector according to the invention.

As shown, the anticollision navigational light comprises a base 1, a colored cylindrical glass pane 2, a cap 3, a casing 4 containing radio-electric antinoise filtering cells, a connector 5 having several pins and a micromotor 6, these elements being interconnected by screws and bolts (not shown) so as to constitute the body of the projector and to define its size. The glass pane 2 is held between the base 1 and cap 3 owing to the engagement of its opposite edges into circular grooves 7, 8 formed in the base 1 and cap 3 respectively, suitable gaskets 9, 10 being interposed. The assembly made up of the cap 3, base 1 and glass pane 2 is rendered unitary by spring wires or like guys which are not visible in the drawing for the sake of clearness.

The projector base 1 has a bore 11 in which is accommodated a ring member 12 made of alumina, beryllium oxide or any other heat-dispelling substance. Said ring member 12 carries a metal socket 13 having ports 14 for the flow of the ventilating air. This socket 13 constitutes the lower electric terminal of an iodine vapor lamp 15. For permitting a better heat transfer from the member 12 to the socket 13, said elements may be brazed together but it will be noticed that the member 12 must be electrically insulating in consideration of the potential of the lower terminal of the lamp 15. Moreover the projector base 1 has a bore 16 of smaller diameter through which is slidably housed an electrically insulating slug 17 having for example a cross-shaped section so as to permit the flow of the ventilating air, said slug having an electric contact 18 engaging under the action of a spring 19 the terminal on the lamp 15. A screw threaded plug 20 engaged over the end of the base 1 holds the casing 4 and spring 19 under a state of compression. A port 21 is formed in the plug 20 for receiving the electrical connecting leads.

As illustrated, several rows of fins 22 are provided on the base 1 so as to ensure a better cooling effect of the lamp 15. It will be noticed that the chosen set up provides a rapid heat exchange between the lamp and fins. Air inlet ports 36 are provided between the fins.

The projector cap 3 has a recess 23 for receiving the upper terminal of the lamp 15, said cap also carrying streamlined vertical fins 24 which, as is clearly visible in the drawing, perform a satisfactory cooling of the upper part of the lamp. Attention is called to the fact that said fins must extend parallel with the flight axis of the aircraft. The cap 3 also has ventilating channels 25 and regulating bimetallic strips 26 which are operative to increase or decrease the free sectional area of these channels in response to the temperature of the lamp so as to keep it at an optimum temperature.

According to an important feature of the invention, there is provided inside the anticollision light a removable revoluble unit designated generally by 27. Said unit comprises a metal reflector 28 having helical fins 29 and recessed in the present construction to receive the lamp 15. The reflector 28 is operatively connected with a toothed wheel 30 engaged through the inner bore of a ball bearing 31 housed in a recess 32 in the base. Owing to this arrangement, the reflector 28 can freely rotate about the lamp responsive to a very small motive torque. The toothed wheel 30 is driven by a small pinion 33 fitted upon the end of the shaft of the micromotor 6. This shaft is engaged through a bore 34 in the base 1.

As will be seen from the drawing, the anticollision navigational light as described is constructed for performing a rotary motion. Rotation of the micromotor 6 imparts motion, owing to the pinion 33 and with the resultant gear ratio reduction, to the toothed wheel 30 which drives the reflector 28 and causes a horizontal circular sweep of the light beam. However by dismantling the revoluble unit 27 and electrically connecting contact 18 on the slug 17 to a remotely located blinking or flash station, the projector constructed as above described may be converted into a blinking light. In such a case, the recess 32 in the base 1 which in the former embodiment received the bearing 31 is used for mounting a cylindrical optical lens made of normal colorless glass or alternatively of "Pyrex" glass the effect of which is to spread or distribute the light through the surrounding space under desirable conditions. This possibility of converting the projector for manifold uses or purposes presents a particular value in the aeronautical field because the two categories of lights can be needed depending upon whether light airplanes or carrier planes have to be equipped and the technical solution adopted in each case permits the various requirements to be met.

Junction of the projector with the electric system of the aircraft is performed by the connector 5 fixed to the casing 4. While the terminal 18 is directly connected to said system, the terminals 35 of the micromotor 6 are connected to said system through antinoise filtering cells accommodated in the sheathing casing 4.

Modifications are conceivable in the ambit of technical equivalencies. Thus the coupling between the motor and the revoluble unit might be performed in a different way, for example by means of an outer or inner gear, a belt and pulley transmission, revolving electric or magnetic fields, etc. Likewise equivalent means might be used for causing simultaneous rotation of the lamp and reflector.

What is claimed is:

1. A miniature projector having a high luminous power for anticollision navigational lights for aircraft or similar purposes, comprsing a body defining an enclosure and having a longitudinal axis, a lamp containing iodine vapor fitted in said enclosure along said axis, electric connections between said lamp and an exterior source of electric energy, a revolving unit rotatably supported in said enclosure so as to be revoluble about its longitudinal axis, said unit comprising a reflector, a carrier and driving means connected to said carrier and to an exterior source of power, ventilating channels terminating adjacent said lamp, and heat sensitive means arranged in front of said channels for regulating the opening of said channels responsive to the lamp temperature.

2. A miniature projector according to claim 1, wherein the body comprises a base, a cap and a glass panel interposed between said base and cap, said ventilating channels being provided in said base and in said cap.

3. A miniature projector according to claim 1, wherein the reflector carries outer fins having a substantially helical outline producing during the rotation of said unit a ventilating action which accelerates air flow through the ventilating channels.

4. A miniature projector according to claim 1, wherein said heat sensitive means are constituted by bimetallic strips.

5. A miniature projector having a high luminous power for anticollision navigational lights for aircraft or similar purposes comprising a body defining an enclosure and having a longitudinal axis, a lamp containing iodine vapor fitted in said enclosure along said axis, electric connections between said lamp and an exterior source of electric energy, a revolving unit rotatably supported in said enclosure so as to be revoluble about its longitudinal axis, said unit comprising a reflector and a carrier, a pinion rigid with said carrier, a micromotor, connecting means provided between said micromotor and said pinion for driving said unit, electric connections between said micromotor and said exterior source of electric energy, ventilating channels terminating adjacent said lamp, and heat sensitive members arranged in front of said channels for regulating the opening of said channels responsive to the temperature of the lamp.

6. A miniature projector having a high luminous power for anticollision navigational lights for aircraft or similar purposes comprising a body having a base, a cap and a glass pane located between said base and said cap and defining an enclosure having a longitudinal axis, a lamp containing iodine vapor fitted in said enclosure along said axis, electric connections between said lamp and an exterior source of electric energy, a revolving unit rotatably supported in said enclosure so as to be revoluble about its longitudinal axis, said unit comprising a reflector, a carrier and driving means connected to said carrier and to an exterior source of power, ventilating channels provided in said base and cap and terminating adjacent said lamp, and heat sensitive means arranged in front of said channels for regulating the opening of said channels responsive to the temperature of the lamp.

7. A miniature projector according to claim 6, wherein said glass pane is covered with a colored superficial cement coating.

8. A miniature projector according to claim 6, wherein said glass pane is covered with a micrometric coating of a colored plastic.

9. An anticollision light for aircraft comprising a body having a longitudinal axis, including a base made of heat-conductive substance, a cap made of heat-conductive substance and a glass pane interposed between said base and said cap, an enclosure defined in said body, an iodine cycle lamp fitted in said enclosure along said longitudinal axis, electric terminals for interconnecting said lamp with an exteriorly located source of electric energy, a revolving unit rotatably supported in said enclosure, said unit including a reflector, a carrier and driving means connected with said carrier and with an exteriorly located source of motive power, apertures provided in said reflector and carrier for accommodating said lamp, whereby said unit may revolve arounnd said lamp, fins provided on said base and cap, and ventilating channels provided in said base and cap, said channels in said cap being in communication with said enclosure and with the outer air, said channels in said base being in communication between said enclosure and the interior of an aircraft.

References Cited

UNITED STATES PATENTS

| | | | |
|---|---|---|---|
| 1,417,457 | 5/1922 | Cook. | |
| 2,452,646 | 11/1948 | Frankel | 240—47 |
| 2,814,029 | 11/1957 | McRea. | |
| 2,929,794 | 3/1960 | Simon et al. | |
| 3,188,217 | 6/1965 | Emmons et al. | |
| 3,255,343 | 6/1966 | Kloss | 240—46.59 |
| 3,338,132 | 8/1967 | Ruhle et al. | |

EUGENE G. BOTZ, *Primary Examiner.*

U.S. Cl. X.R.

240—7.7, 47; 340—87